March 25, 1930.  H. W. NIEMAN  1,751,647
SERVO MECHANISM
Filed Jan. 8, 1926   10 Sheets-Sheet 1
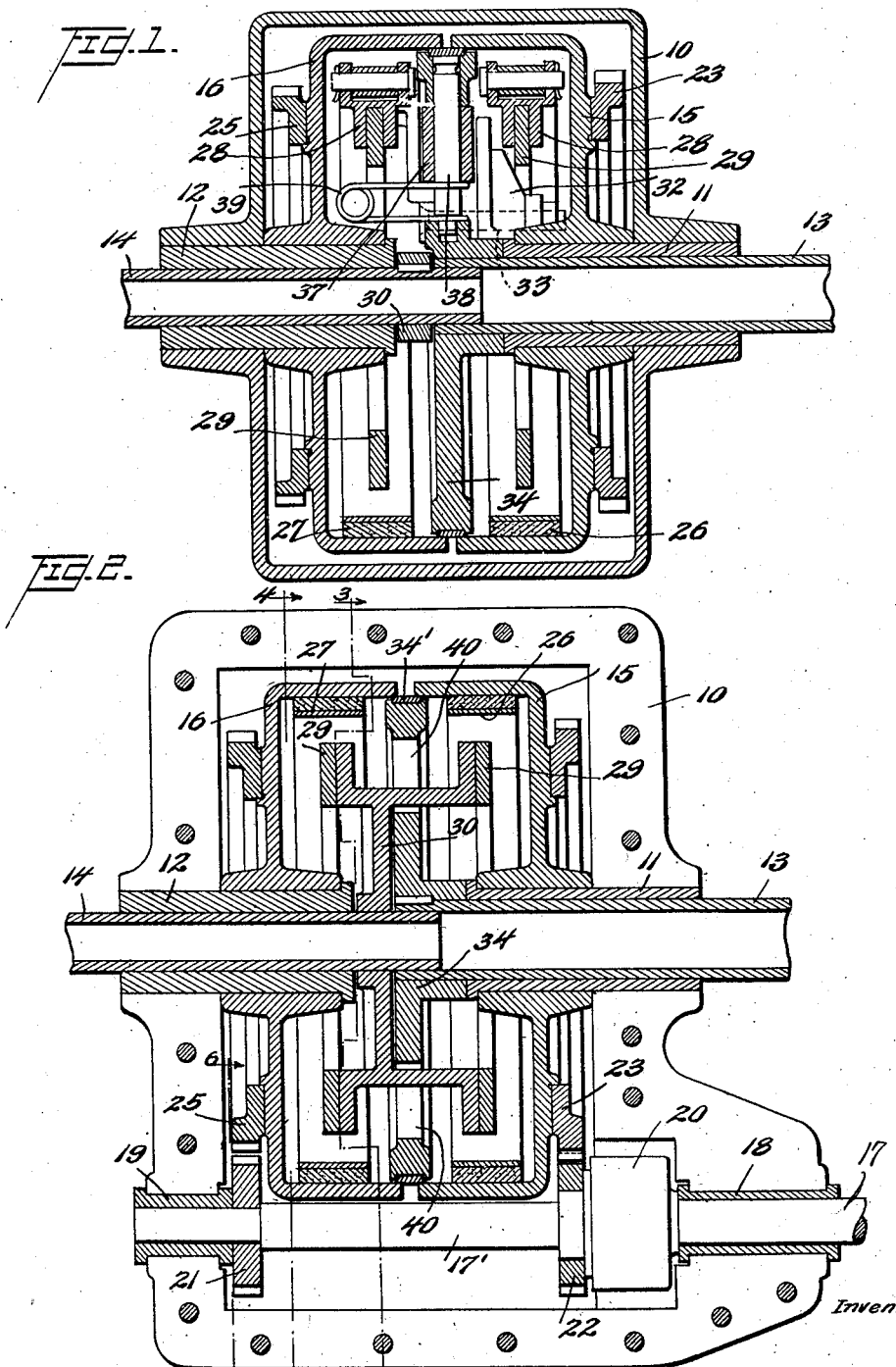

March 25, 1930.  H. W. NIEMAN  1,751,647
SERVO MECHANISM
Filed Jan. 8, 1926   10 Sheets-Sheet 2
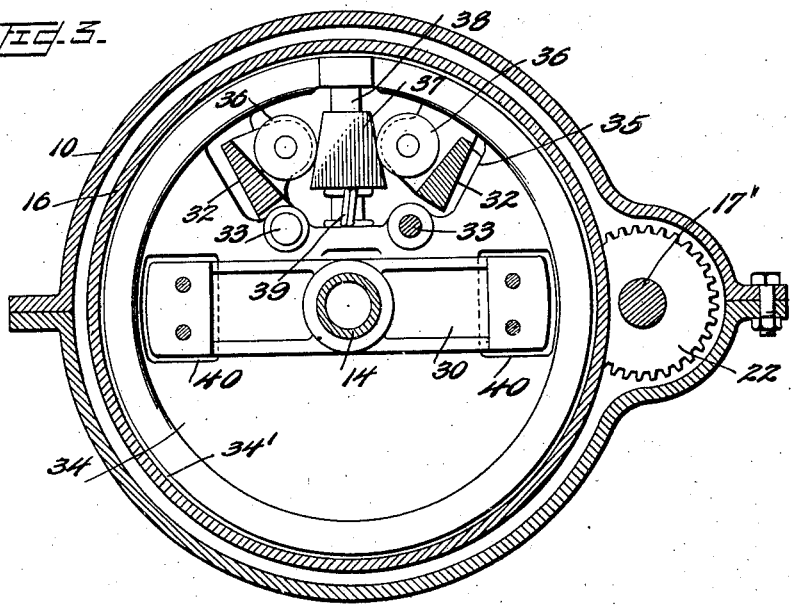
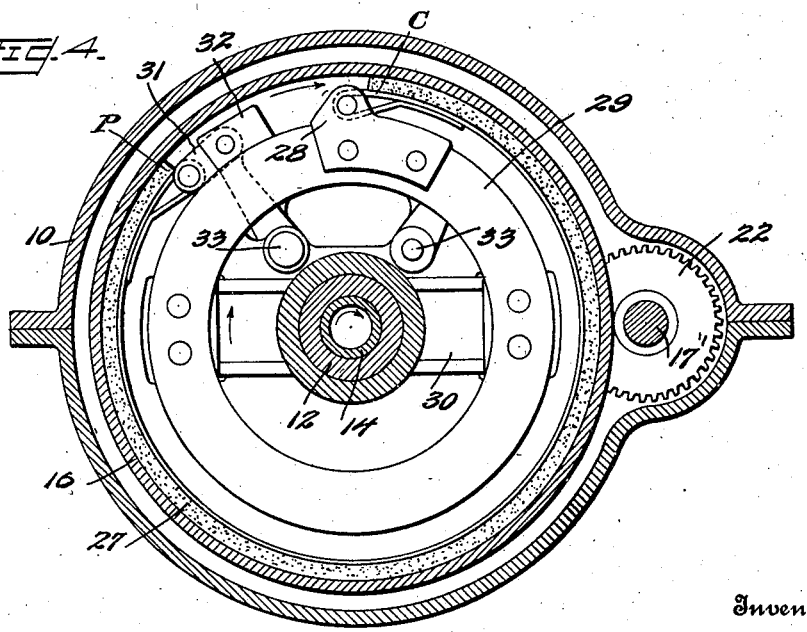
Inventor
By Henry W. Nieman,
Watson, Coit, Morse & Grindle
Attorneys March 25, 1930.  H. W. NIEMAN  1,751,647
SERVO MECHANISM
Filed Jan. 8, 1926   10 Sheets-Sheet 3
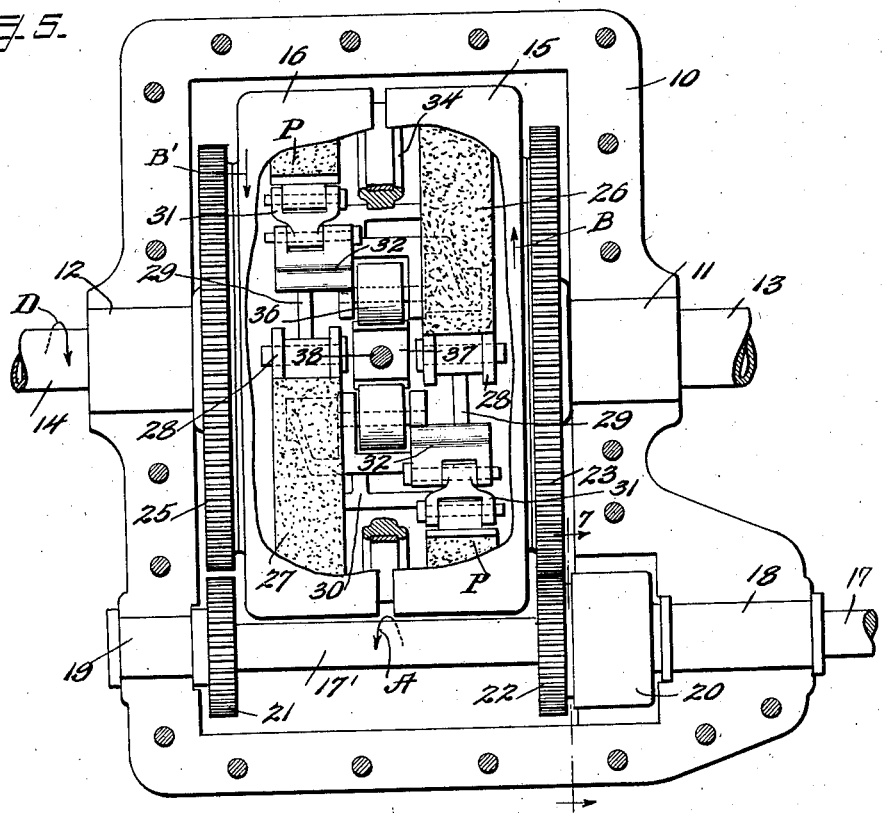
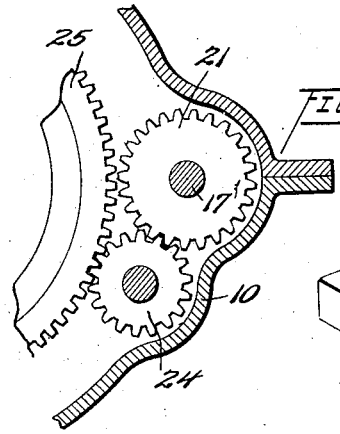
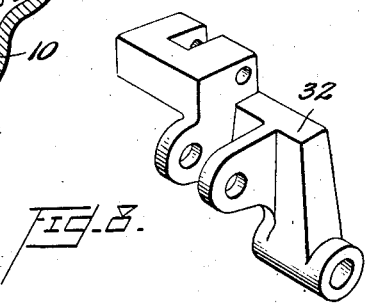
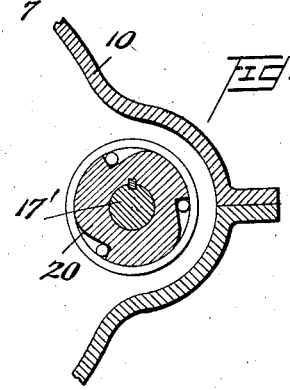
Inventor
Henry W. Nieman,
By Watson, Coit, Morse + Grindle
Attorneys March 25, 1930.  H. W. NIEMAN  1,751,647
SERVO MECHANISM
Filed Jan. 8, 1926   10 Sheets-Sheet 4
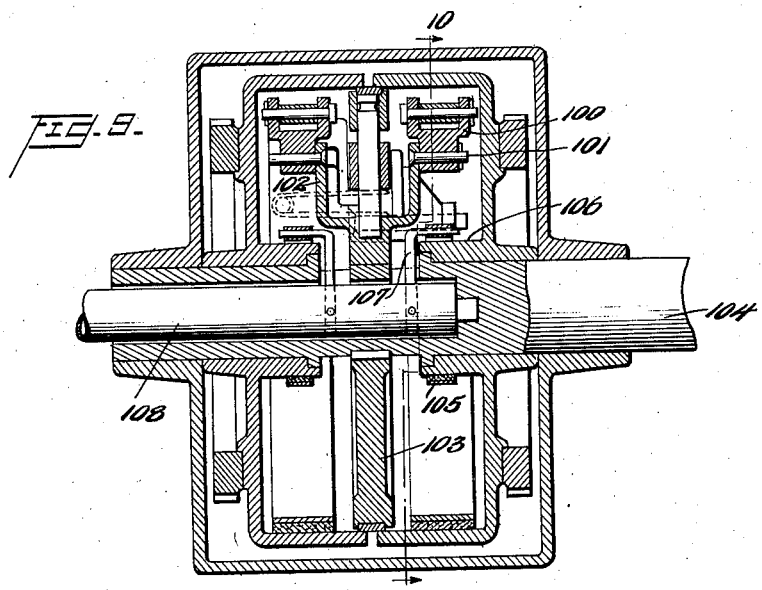
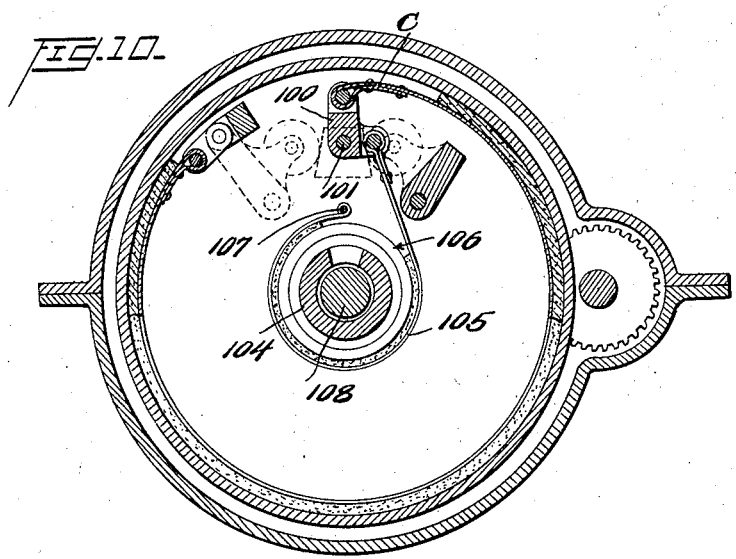
Inventor
Henry W. Nieman,
By Watson, Coit, Morse & Grindle.
Attorney March 25, 1930. H. W. NIEMAN 1,751,647
SERVO MECHANISM
Filed Jan. 8, 1926 10 Sheets-Sheet 5
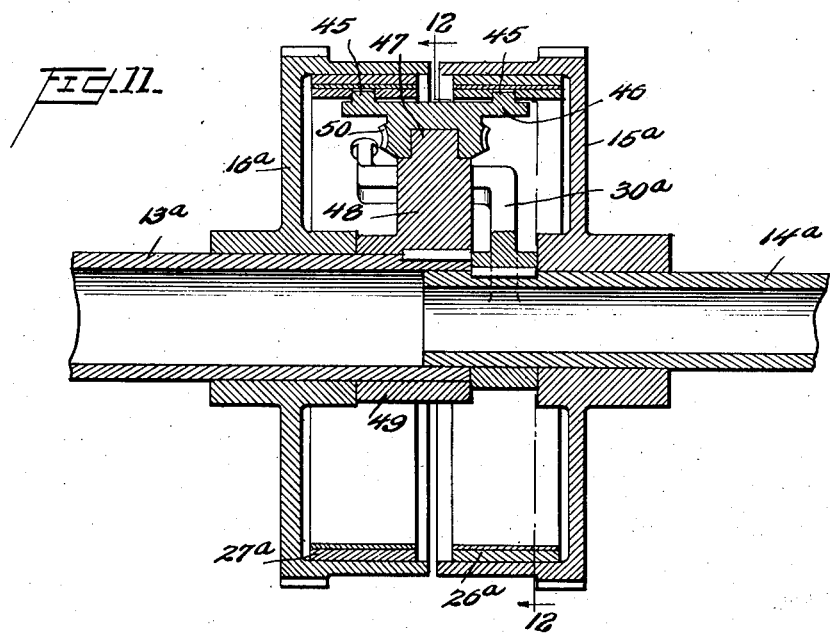
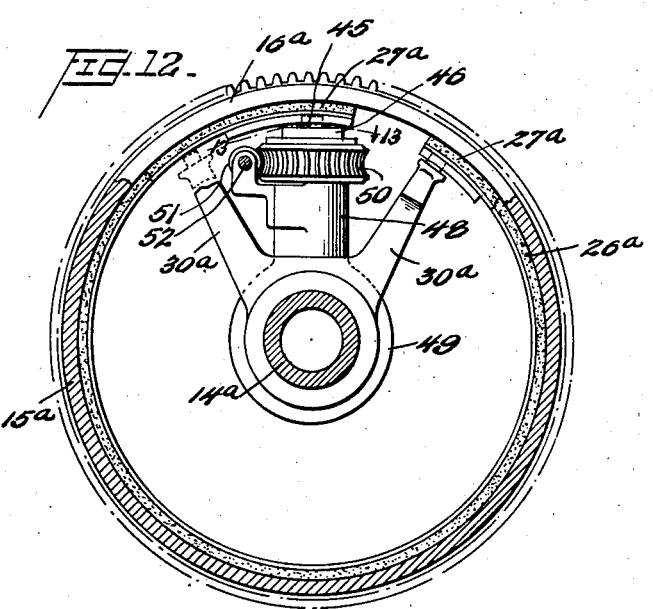
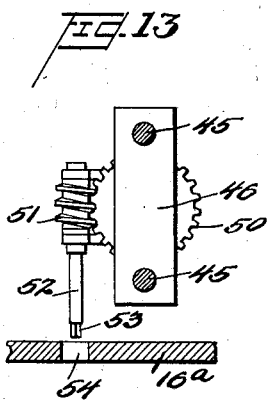
Inventor
By Henry W. Nieman,
Watson, Coit, More + Grindle.
Attorneys

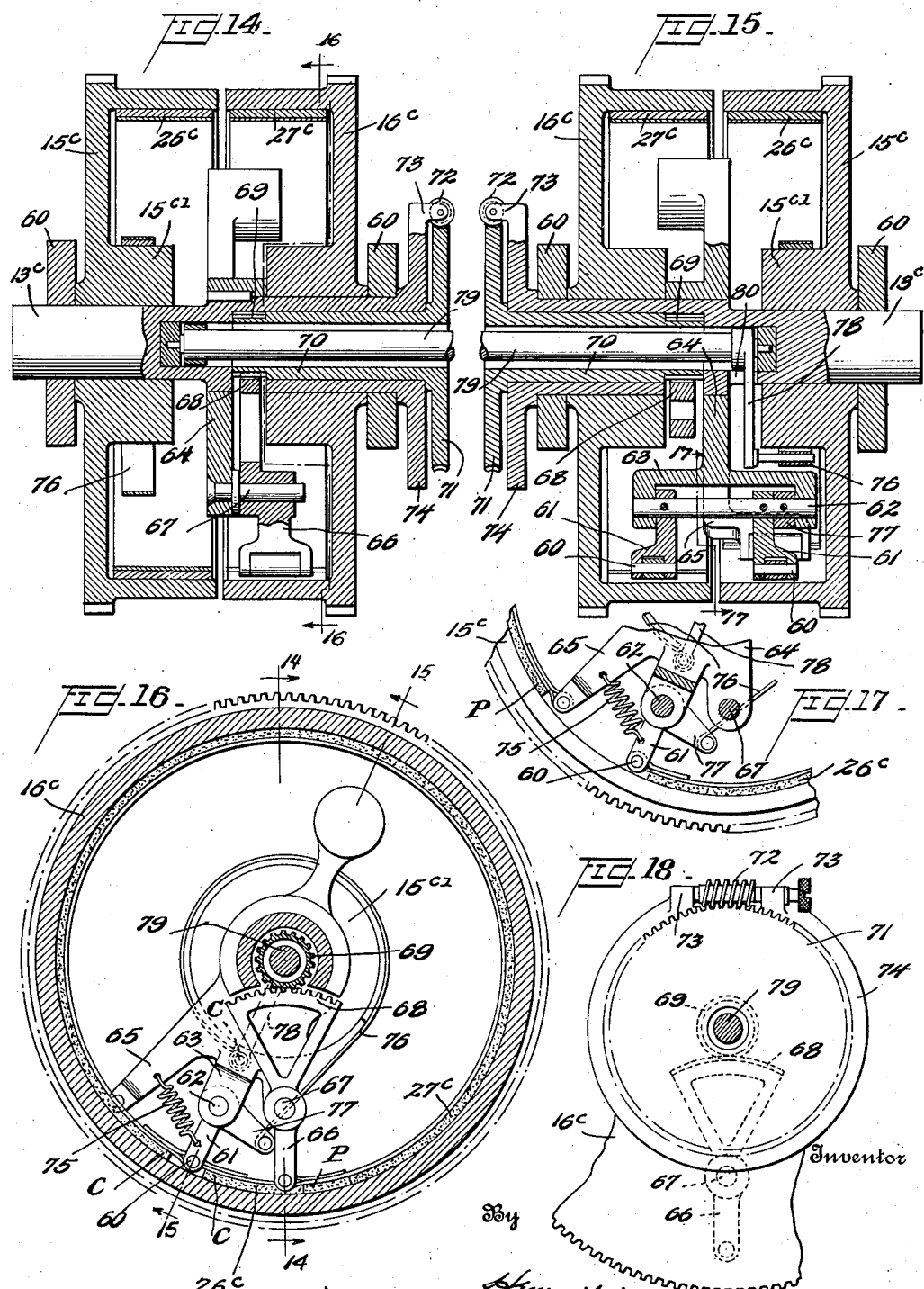

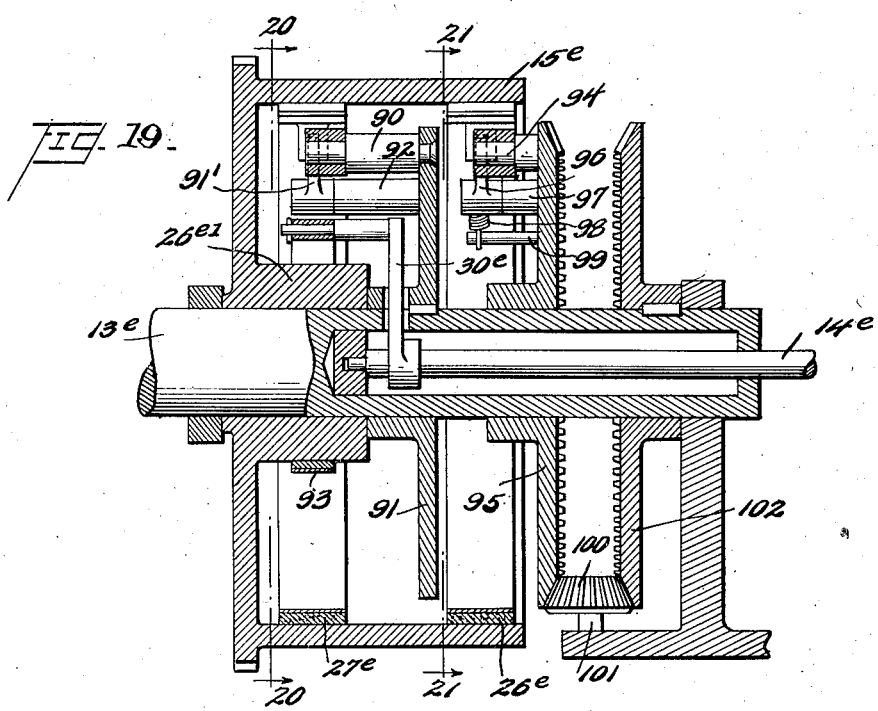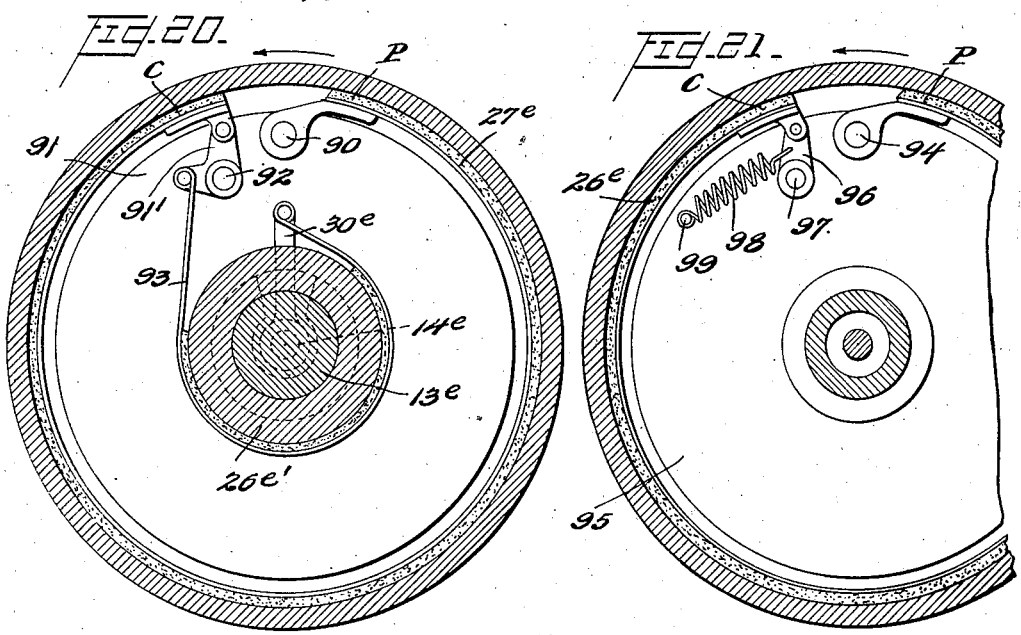

March 25, 1930.   H. W. NIEMAN   1,751,647
SERVO MECHANISM
Filed Jan. 8, 1926    10 Sheets-Sheet 8

INVENTOR
Henry W. Nieman
BY
Watson Coit Morse & Grindle
ATTORNEYS

March 25, 1930.  H. W. NIEMAN  1,751,647
SERVO MECHANISM
Filed Jan. 8, 1926    10 Sheets-Sheet 9
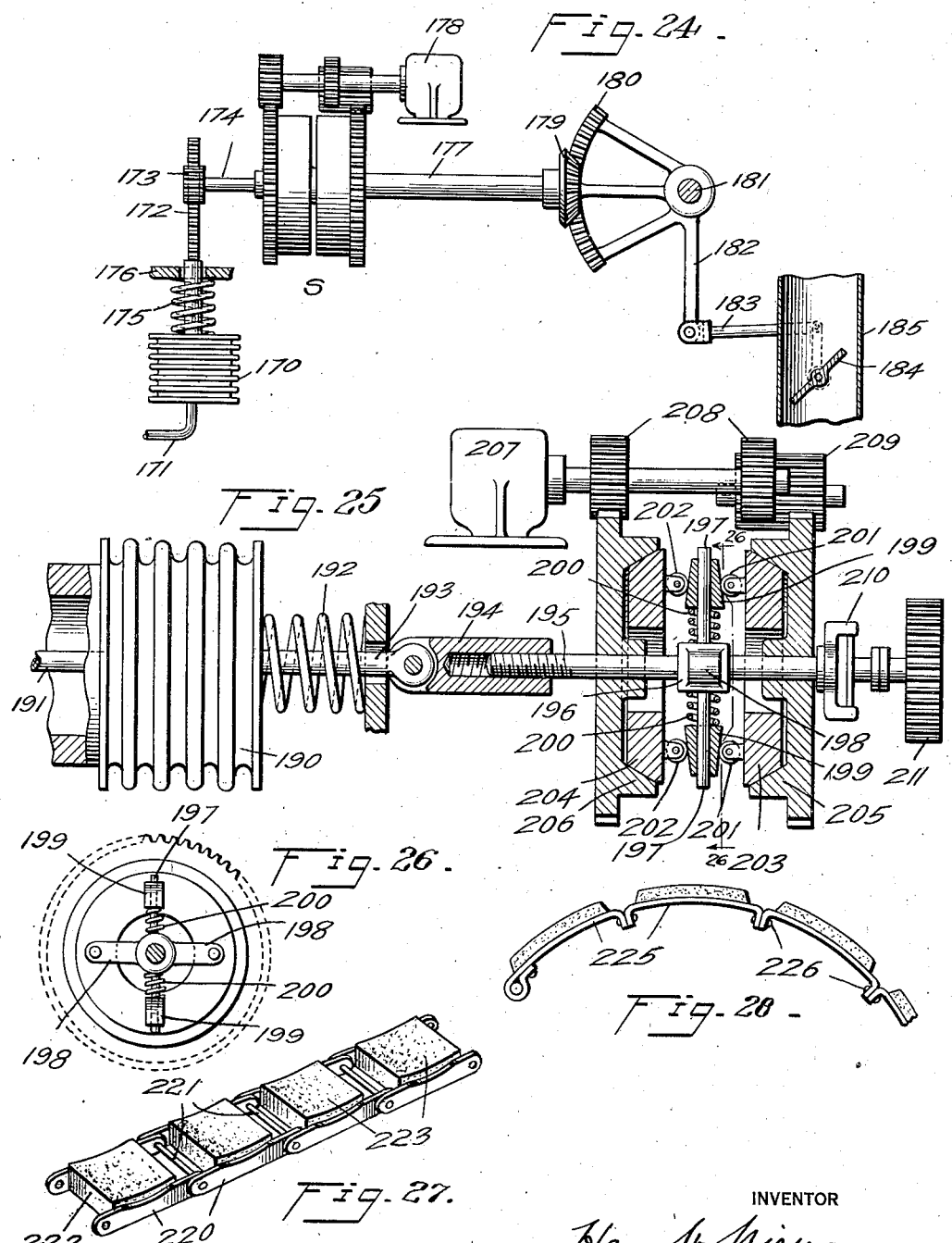

March 25, 1930.  H. W. NIEMAN  1,751,647
SERVO MECHANISM
Filed Jan. 8, 1926   10 Sheets-Sheet 10
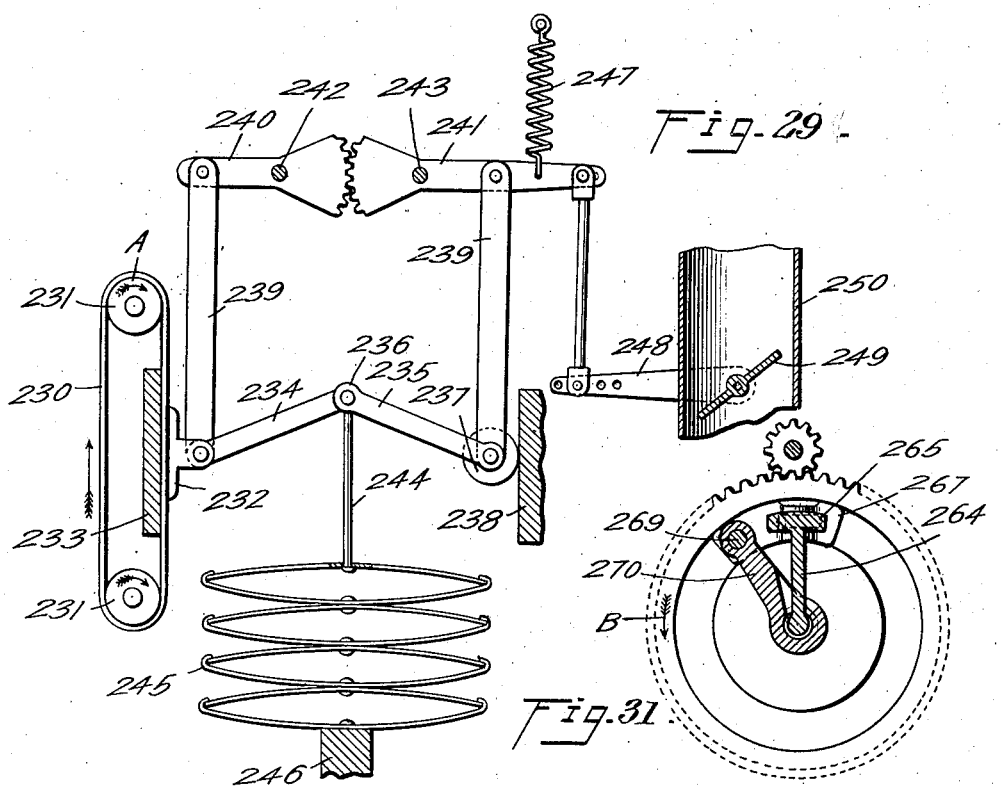
Fig. 29.
Fig. 31.
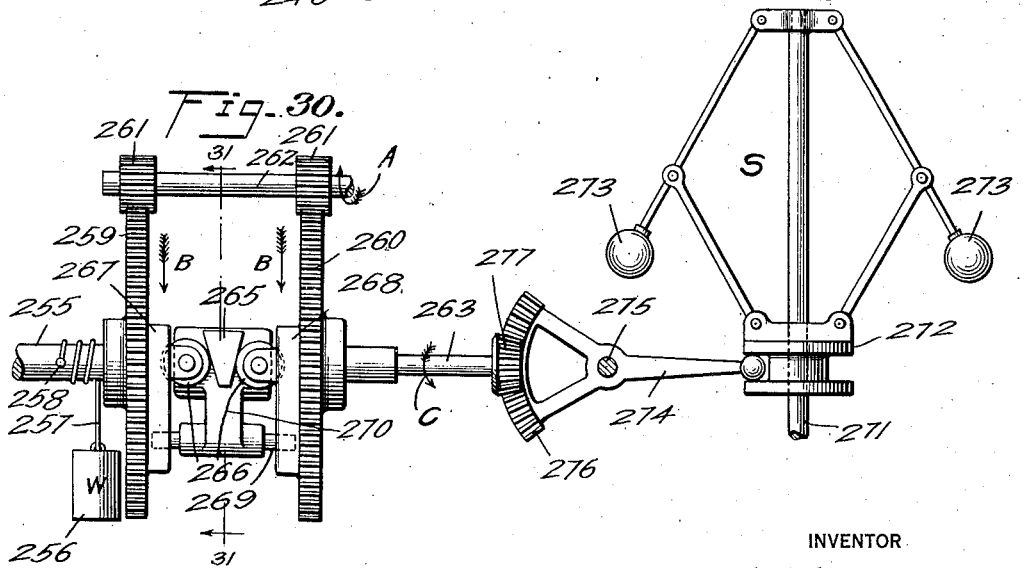
Fig. 30.
INVENTOR
Henry W. Nieman
BY
Watson Coit Morse & Grindle
ATTORNEYS Patented Mar. 25, 1930

1,751,647

UNITED STATES PATENT OFFICE

HENRY W. NIEMAN, OF BETHLEHEM, PENNSYLVANIA

SERVO MECHANISM

Application filed January 8, 1926. Serial No. 79,956.

The present invention relates to mechanisms for the manipulation of heavy or frictionally retarded bodies by power derived from a suitable power source and under the close control of an operator or mechanical control device.

In the operation and control of many types of modern machines and implements the problem of manipulating, at the will and under the close control of an operator acting manually, or under the direction of a mechanical control device, a relatively heavy body or member the movements of which are opposed and retarded by heavy frictional or other forces, arises frequently. Heretofore various types of power operated devices have been employed to assist in the manual or automatic operation of many types of machines, but wherever it was found essential to manipulate such bodies or devices so that they have at all times syntactic relationship with the control element, which is moved manually or by a mechanical control device, it has been found that there was objectionable lagging in time or in space or in both, between the control element and the body, device, or mechanism to be operated. Previous efforts to eliminate such undesirable lagging have not met with success, or at most have met with only partial success, and in all cases where such attempts have been made, the apparatus has been rendered much more complex in structure and correspondingly less reliable in operation.

The object of the present invention is to provide a mechanical mechanism, which is hereinafter designated a "servo-mechanism" by means of which power may be applied to a body or instrumentality to be operated under the close control of an operator or a mechanical control mechanism and whereby such body or instrumentality may be actually moved strictly in syntactic relationship with the movements of the control element of such servo-mechanism whether the control element be manually operated or mechanically operated.

The servo-mechanism, several forms of which are hereinafter described in detail, has many uses throughout the mechanical arts. In one form or another it may be incorporated as a portion of the steering mechanism of a vehicle or boat to render it possible for the steersman to manipulate the steering wheels, or rudder as the case may be, in exact syntactic relationship with the steering element but with the expenditure of very little manually applied power. Or the servo-mechanism may be used to manipulate heavy bodies such as guns, water gates, heavy valves and dampers and the like.

The power transmitted by the work member of the servo-mechanism to the body or object being manipulated is taken frictionally from a suitable source, as for instance from one or more rotating drums, by friction elements which employ the principle of wrapping friction, as by such means it is possible to cause the mechanism to deliver to the work member a very large force without necessitating the application, by manual or other means, to the control element, of forces of any great magnitude.

In certain instances, however, it is not necessary to employ wrapping friction elements and in general the type of servo-mechanism which is to be employed for any particular purpose will largely depend upon the nature of the work to be done. It is therefore contemplated that the servo-mechanism may vary considerably in design and construction, depending upon the purposes for which it is designed, but without departure from the spirit and scope of the invention in that each such embodiment of the invention nevertheless permits the manipulation of the body or instrumentality to be acted on by power, and in such manner that such body or instrumentality shall bear a syntactic relationship to the control element at all times, the time and space lag of the work member behind the control element being practically negligible.

In the drawings:

Figures 1 to 8 inclusive illustrate that embodiment of the servo-mechanism which will first be described in detail. In this group Figure 1 is an axial section through the servo-mechanism; Figure 2 is likewise an axial section but taken in a plane at 90° to the section plane of Figure 1; Figure 3 is a section on line 3—3 of Figure 2; Figure 4 is a section on line 4—4 of Figure 2; Figure 5 is a top plan view of the mechanism with part of the casing removed and part of the interior mechanism broken away; Figure 6 is a section on line 6—6 of Figure 2; Figure 7 is a section on line 7—7 of Figure 5; and Figure 8 is a perspective view of a detail.

Figure 9 is an axial section through a servo-mechanism which is, for the most part similar to that disclosed in Figures 1 to 8 inclusive, but which departs therefrom in several features of its detailed construction; and Figure 10 is a section on line 10—10 of Figure 9.

Figures 11, 12 and 13 illustrate another embodiment of the servo-mechanism, Figure 11 being an axial section therethrough; Figure 12 a section on the line 12—12 of Figure 11; and Figure 13 a section on the line 13—13 of Figure 12.

A still further embodiment of the servo-mechanism is fully illustrated in Figures 14 to 18 inclusive, Figure 14 being an axial section taken on the line 14—14 of Figure 16; Figure 15 a section taken on the line 15—15 of Figure 16; Figure 16 a section on the line 16—16 of Figure 14; Figure 17 a fragmentary section on line 17—17 of Figure 15; and Figure 18 being an end elevation of a portion of the mechanism.

Again in Figures 19, 20 and 21 inclusive a further embodiment is illustrated, Figure 19 being an axial section therethrough; Figure 20 a section on the line 20—20 of Figure 19; and Figure 21 a section on the line 21—21 of Figure 19.

Figure 24 is a somewhat similar diagrammatic view, showing the servo-mechanism applied to a damper operating apparatus.

Figure 22:
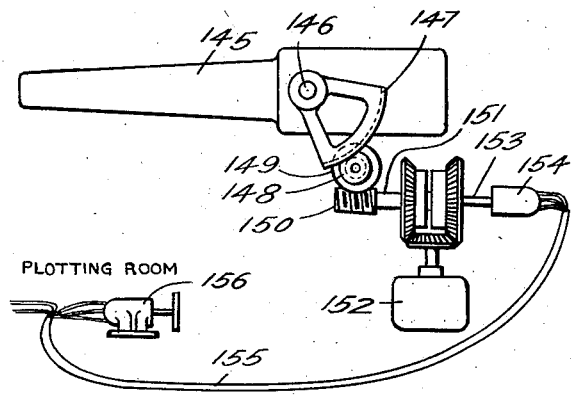
Figure 22 is a diagrammatic illustration of one form of the servo-mechanism operatively connected to a pivotally mounted gun.

Figure 25 shows another form of the servo-mechanism, and in a somewhat different type of apparatus; Figure 26 is a section on the line 26—26 of Figure 25; Figures 27 and 28 illustrate, respectively, two types of wrapping friction bands which may be employed in the servo-mechanism; Figure 29 illustrates a still different form of the servo-mechanism as applied to a damper operating means.

Figures 30 and 31 show in elevation (Figure 30) and in section on line 31—31 (of Figure 30) respectively a servo-mechanism of still different type, not employing the principle of wrapping friction.

That embodiment of the servo mechanism which is illustrated in Figs. 1 to 8 inclusive, will now be described in detail. The moving parts of the mechanism are enclosed in a two-part casing 10 which may be of pressed steel or other suitable material. Mounted in aligned apertures in the casing are the co-axial sleeves 11 and 12, respectively, which constitute bushings within which the coaxial shafts 13 and 14 may freely rotate and which also comprise journals upon which the hubs of the rotatable drums 15 and 16 may freely revolve. The shafts 13 and 14 telescope slightly centrally of the casing but are not secured together. The shaft 13 comprises the work member of the servo mechanism and the shaft 14 the control shaft.

A power shaft 17, receiving power from a suitable source, mounted in a bushing 18, is normally connected by a one-way clutch 20 with driving shaft 17', aligned therewith and having one end mounted in a bushing 19. Mounted upon the driving shaft are pinions 21 and 22, the teeth of pinion 22 meshing directly with those of a toothed annulus 23 rigidly secured to drum 15, and the teeth of pinion 21 meshing with those of an idler 24 (Figure 6) the teeth of which idler in turn mesh with those of a second toothed annulus 25 rigid with drum 16.

It will be obvious that in a construction such as above described, rotation of power shaft 17 in one direction will cause rotation of drums 15 and 16 respectively, in opposite directions.

The drums are cup-shaped members having flanges perpendicular to the web portions and are so disposed that the flanges extend toward each other, the parallel edges thereof being separated by only a slight gap. The cylindrical inner faces of the flanges comprise friction surfaces and against these surfaces lightly bear the friction bands 26 and 27 respectively. These bands are of a similar nature, comprising metal strips with facings of cork or other suitable material. Each band has a control end C and a power end P and they extend in opposite directions around the drums from their control ends, which are substantially in the same radial plane, as can be seen clearly from Figure 5. The control end of each band is looped around a shackle member 28, these shackle members being rigidly secured to similar spaced parallel rings 29, 29 respectively which are in turn fastened by riveting or otherwise, at diametrically opposed points, to a cross arm 30 which is keyed on the control element or shaft 14, the outer ends of the cross arm 30 being channel-shaped to provide suitable portions to which these rings may be secured.

The power ends of the two bands are provided with similar links 31—31 and these links are connected to the upper ends of similarly formed rocker arms 32—32 the lower ends of the rocker arms being pivotally mounted upon studs 33—33 which extend outwardly in opposite directions from a large central transverse disk 34 which is keyed to the work member 13. The rocker arms in effect cross each other, both passing thru an opening 35 in the central disk 34, and each rotatably supports in the plane of this disk an anti-friction roller 36. These rollers bear respectively against the inclined faces of an outwardly tapering wedge 37 which is axially apertured to receive a rod 38 upon which it is slidably mounted. A spring 39 of any suitable form urges the wedge radially outward and tends to separate the anti-friction rollers and hence to separate the rocker arms and to force the power ends of the bands lightly against their respective drums.

The rod 38 has its ends firmly mounted in the margins of the aperture 35 in disk 34 and comprises, in reality, an integral part of the disk. The periphery of disk 34 is provided with a felt band 34' which lightly presses against the margins of the inner friction faces of the drums and this band effectively prevents the entrance of dust into the space within the drums.

Assuming the driving shaft to be rotating continuously in the direction of the arrow A (Figure 5) it follows that the drums will be rotating respectively in the direction indicated by arrows B and B'. Both bands will be pressing lightly against the rotating drums because of the action of the spring 39 and wedge 37, as previously pointed out. The tendency toward frictional retardation of the drums by the bands will however be negligible, the pressure being extremely light. Assuming further however that the control shaft 14 is rotated manually (or by some suitable power actuated instrumentality such as the receiving motor of an alternating current data transmission system) in the direction of the arrow D (Figure 5) it will be apparent that the control end of band 27 will be moved in the direction of rotation of drum 16 and that this band will frictionally engage the drum with increased force. The band, thus engaged with the drum, takes from the drum an amount of power which is determined by the amount of torque which the operator exerts on the control element 14 and this power is delivered by the power end P of the band, thru the corresponding rocker arm and anti-friction roller 36 to the wedge 37. The wedge is so designed as to be immovable on its supporting rod 38 under the action of one only of the anti-friction rollers, that is, when one only of the bands is effectively engaged, the radial component of the force exerted by the roller on the wedge being less in magnitude than the force necessary to overcome the frictional resistance of the wedge to inward sliding. Hence the wedge comprises a firm abutment and the power delivered by the power end of the band is transmitted directly to the disk 34 and hence to the work shaft 13 to which the disk is keyed.

During this time the band 26 has been disengaged from the corresponding drum, movement of shaft 14 in the direction of arrow D serving to tighten band 27 but to loosen band 26, that is, to decrease the pressure of band 26 against its associated drum. There is little or no opposition within the mechanism therefore to rotation of the work shaft 13.

Rotation of the control shaft 14 in a direction opposite to that indicated by arrow D will result in the loosening of band 27 and the effective engagement of band 26 so that the work shaft 13 is likewise turned in a contrary direction. The wedge 37 is so designed that when either of the bands alone is active to transmit power thereto, it constitutes a firm and non-yielding abutment as has been previously pointed out. If there is however, at any time, a tendency of both bands to engage their respective drums, so that both anti-friction rollers 36 act simultaneously upon the wedge 37 with oppositely directed and equal or nearly equal forces, it will be obvious that the frictional resistance of the wedge to sliding on rod 38 will disappear and that the wedge will move radially inward against the action of spring 39 to relieve the simultaneous gripping of the bands. The wedge therefore and its associated mechanism comprises an automatic adjusting device which prevents excessive frictional losses due to simultaneous engagement of the bands, insures that the bands are kept in light frictional engagement with their respective drums so that there is no lost motion present with possibility of "back-lash" or vibration, and it further comprises a wear compensating medium since it is equally operative in all positions in which it may be placed and, as wear occurs in the parts of the mechanism, will move outwardly, taking up any play which may have resulted from such wear.

The clutch 20 is so designed that that portion of the driving shaft which lies within the casing may always be driven by the external source of power, whatever it may be, in the direction of the arrow A (Figure 5). Should the power source reverse its operation however, the clutch will disengage itself.

In the natural operation of the mechanism the shafts 14 and 13 will be always substantially in the same phase of movement. They are of course not connected to each other, save thru the intermediate mechanism but there is so little play thru the bands and wedge from one shaft to the other that movement of shaft 14 results in substantially simultaneous movement of shaft 13. When the operator of the control element ceases to rotate the same, the engaged band immediately disengages itself and shaft 13 likewise comes to a stop thus insuring maintenance of phase between the two shafts. Disengagement of each band and the corresponding drum is effected by the band sections successively disengaging themselves from the drum with the final cumulative effect that the power end is advanced slightly when the band passes from engaged to disengaged position. It is apparent also that the operator may rotate shaft 14 at any speed which varies from zero up to the speed of rotation of the drums, the bands taking just enough power from the drums for the purpose required.

In certain instances it is desirable that the work member or shaft 13 be operated manually in case of the failure of the mechanism thru breakage of the bands or failure of the power source. Inasmuch as the channel-shaped ends of the cross arm 30 extend thru apertures 40 in disk 34, which apertures are only slightly greater in width than the ends of the cross arm, the control and work shafts are prevented from relative rotation to any material extent even when the bands have failed. Prior to any failure of the bands the end portions of the cross arm will lie centrally in the apertures 40, as shown in Figure 3, but at no time touching the edges of these apertures. Failure of a band will of course permit relative movement of the cross arm and disk 34 so that the end portions of the cross arm will strike the edges of the apertures, when shaft 14 is rotated in either direction. During manual operation in the event of failure of the power source, the bands will function as before and the driving shaft 17' will be rotated in the direction of the arrow A. Obviously however when the driving shaft which lies within the casing is rotated in the direction of arrow A, the clutch 20 will automatically disengage the driving shaft from the power shaft which is connected to the power source so that it is unnecessary for the operator to also rotate manually the electric motor or other engine which may be employed to rotate the power shaft.

Not only does the clutch serve to disconnect the drums and power source when the direction of rotation of the power shaft is accidentally reversed, or the power source fails completely, but it also serves to sever the connection between the drums and power source whenever the control element is rotated at a greater angular velocity than the drum or drums. Thus it may sometimes occur that the control element is rotated at greater angular velocity than the drum, even when the drum is being turned at normal speed, or that the power source may not be able to rotate the drum or drums at the speed normally intended. The mechanism is so designed that the control element may be freely operated despite the slowing down of the drums or the speeding up of the control element itself, the clutch serving to effect an automatic disconnection of control element and power shaft under such circumstances, so that the power source is not a drag, retarding the operation of the mechanism. Of course in many applications of the servo mechanism it will not be possible to manipulate the control element at the proper speed, or at all, in the event of the slowing down or failure of the power source, because of the very heavy load on the work shaft, but in other applications of the mechanism this will be quite possible, for instance where the servo mechanism is incorporated in the steering mechanism of a vehicle. In this case the driver is ordinarily able to exert a sufficient torque on the steering rod, (which is here the "control element") to turn the vehicle wheels, despite the entire or partial failure of the power source of the servo mechanism.

Clutch 20 serves a further function in that it prevents a reversal of rotation of the power shaft. There are circumstances under which the body to be manipulated may exert a toque on the work member and thence through the bands and drums to the power shaft to reverse the normal direction of rotation thereof. For example, if the servo mechanism were being used with the power source idle, a severe force on the body being manipulated could result in a torque on the work shaft and thence through the drum and band system on the power shaft. The one-way clutch, operatively interposed between the power shaft and the drums, prevents such a force reversing the power shaft. Obviously there are other means for effecting this particular function. For example, an irreversible gearing between the work shaft and the body being manipulated will likewise prevent forces being transmitted from such body to the power shaft. An example of such a connection will be described later in connection with the showing of Fig. 22.

Normally the control element is rotated at less angular velocity, than that of the power driven drum or drums and by the application of a relatively small force thereto. The torque developed at the work member may be few or very many times that impressed upon the control element, depending upon the details of construction of the mechanism, which may be either of high or low amplification as desired.

The mechanism may be designed to give different ratios of power amplification to suit different uses by altering its dimensions and by the use of bands of various kinds. If desired the device may be provided with additional bands connected to the control ends of the bands illustrated for the purpose of moving them into engaged position, thus greatly increasing the power magnification.

Bands 26 and 27 are sufficiently flexible so that they readily conform to the cylindrical friction faces or surfaces of the drums. This type of engagement of band with drum may be expressed by the term "wrapping", and the type of friction thereby involved may be designated as "wrapping friction". Obviously the term "wrapping", as used in this specification and the claims appended thereto, is not limited to the condition of bands enveloping or being outside of the drums. Actually in the form just described, the bands "wrappingly" engage the inside cylindrical surfaces of the drums respectively.

Such a construction is illustrated in Figs. 9 and 10. Here the servo mechanism is constructed exactly as before in so far as the rotating drums, main friction bands, wedge, etc., are concerned but in lieu of the control means shown in the first seven figures a different type, one employing inner bands, is incorporated. The control end C of each outer band is attached to the longer arm of an internal level 100, formed as a bell crank. These levers are pivotally supported on pins 101 which are in turn supported respectively in arms 102 which spring from disk 103 keyed on work shaft 104. To the other arm of each lever 100 is attached the work end of an inner band 105, these inner bands being disposed around cylindrical friction surfaces 106 formed exteriorly on the hubs of the revoluble drums. The inner bands are oppositely disposed as in the case of the outer bands and their control ends are attached to the control arms 107 of rotatable control element 108. Rotation of this control element in either direction results in frictional application of one or the other of the inner bands and hence frictional application of the outer band to which it is attached. The operation of the apparatus is the same as that of the first servo mechanism described except for the further amplification of the control force which is brought about by the action of the inner band.

Another embodiment of the invention, which is illustrated in Figures 11, 12 and 13 has for its principal thought the provision of a servo mechanism of the general type outlined above but without the automatic adjusting device that is, without the sliding wedge interposed between the power ends of the bands. The rotating drums of this form of the invention are indicated at 15ª and 16ª respectively and the work and control shafts at 13ª and 14ª respectively. A suitable casing may be provided and any suitable means for rotating the drums in opposite directions. The control shaft has keyed thereto a hub from which the control arms 30ª radiate and the control ends of the bands 26ª and 27ª are secured to the ends of these arms. The power ends of the bands are provided with plates having apertures to receive the lugs 45 of an adjustable abutment member 46 which is rotatably mounted upon the spindle-like projection 47 of arm 48 which forms part of a hub 49 keyed to the work member 13ª.

Adjustment member 46 is rotatable upon the spindle 47 and for effecting such rotation it is provided with a series of external teeth 50 which mesh with those of a worm 51. Worm 51 has an axially projecting spindle 52 the end of which is squared as at 53 to receive a key which may be inserted thru aperture 54 in drum 16ª. Rotation of the worm and adjustment member effects movement of the power ends of the bands in opposite directions and by such rotation the bands may either be pressed simultaneously more tightly against the drums with which they cooperate, or simultaneously withdrawn from the drums. While the adjustment is not automatic as in the case of the wedge of the first embodiment of the invention described, yet a construction such as that just described will be satisfactory where opportunity is had to effect the manual adjustment from time to time. Of course the adjustment cannot be made while the drums are rotating. The worm locks adjusting device 46 against accidental movement. While only those portions of this embodiment of the invention are shown and described which pertain particularly to the novel form of band adjusting device, yet it will be understood that a suitable casing, drive means and clutch of the general type shown in Figures 1 to 8 may be provided.

A form of the invention which provides for manual adjustment of the bands, which adjustment may be effected while the mechanism is in operation, i. e., while the drums are rotating, is illustrated in Figures 14 to 18 inclusive. Other important departures from the mechanisms heretofore described are also shown and these will now be described in detail. The drums 15ᶜ and 16ᶜ are rotatably mounted upon the work shaft 13ᶜ which shaft is supported in bearings 60, 60. The drums are provided with internal hubs the outer surface of one of which, i. e., the outer surface of hub 15ᶜ′, constitutes also a cylindrical friction surface. The bands 26ᶜ and 27ᶜ have their control ends C looped around coaxial pins 60 which are positioned at the outer ends of arms 61, the inner ends of these arms being non-rotatably secured upon a rocker shaft 62. This short shaft is rotatably mounted in aligned bearings in the channel-shaped projection 63 of web 64 which is integral with or keyed to the work shaft.

The power end P of band 26ᶜ is secured to a radially extending arm 65 which is integral with web 64 while the power end P of band 27ᶜ is secured to the outer end of a lever 66 pivoted at 67 to a short projecting portion of web 64. The inner end of lever 66 is provided with a toothed segmental portion 68 the teeth of which mesh with the teeth of a pinion 69 integral with a sleeve 70 which closely fits within the hollowed out work shaft. At its outer end sleeve 70 is provided with a worm wheel 71, the teeth of which mesh with a worm 72 rotatably journalled in lugs 73 formed on the periphery of a disk 74 integral with the work shaft. Rotation of the worm therefore results in rotation of sleeve 70 and pinion 69, resulting in movement of lever 66 and hence in contraction or expansion of band 27°.

The control ends of the bands are manipulated by rocking the rock shaft 62. This rock shaft is moved in one direction by the action of a spring 75 which normally tends to draw it in a clockwise direction (Figure 16), the opposite end of the spring being secured to the rigid arm 65, and is drawn in the opposite direction by the pull of a third friction band 76 the power end of which is connected to an arm 77 which is also keyed or otherwise non-rotatably secured to rock shaft 62. Friction band 76 passes around the inner drum 15°′ previously referred to and has its control end C connected to the outer end of a control arm 78 of a control element 79 which extends axially thru sleeve 70. The work shaft is slotted at 80 for the passage of the control arm 78.

With the drums in rotation, but with no torque being exerted on the control element, the parts occupy the positions in which they are shown in Figure 16. Here the spring 75 is acting to bring the band 27° into engagement with its drum but the action of the spring is counterbalanced by the pull of band 76 which is in light constant engagement with drum 15°′. Under these conditions the control ends of the bands will not be moved in either direction. If the control element 79 is turned so as to move the control arm 78 in a counter-clockwise direction, however, the inner band 76 will grip the drum 15°′ and will exert a sufficient pull on arm 77 to move this arm upwardly (Figure 16) against the action of spring 75 and hence to contract band 27° and expand band 26° with the result that the work shaft is rotated in a counter-clockwise direction. If however, the control arm 78 is moved in a clockwise direction (Figure 16) the normally constant frictional pull of band 76 on arm 77 will be relieved and spring 75 will be effective to rock shaft 62 in a clockwise direction with the result that band 26° will be contracted and band 27° will grip the corresponding drum. With such engagement the work shaft will be rotated in a clockwise direction. At any time when it appears that there is excessive frictional losses due to tightness of engagement of bands 26° and 27° with their respective drums, or objectional looseness of the bands resulting in what is known as "backlash" or vibration between the tight position of one band and the tight position of the other, the worm 72 may be rotated by the thumb screw provided to effect the desired band adjustment.

The bell crank lever 61—77 described above I designate an "internal" lever, meaning by this a lever which has either its fulcrum, its force receiving point or its force delivery point attached to the work member, and a second of these three points attached to the control member. It is preferably not intended or designed to increase by its action the force delivered by the power end of the inner band. Synchronous action of the control element and work member cannot well be realized in cases where such internal levers are employed in the event that an attempt is made by their use to increase the ratio of power amplification. The friction bands and other elements have a certain amount of resiliency and it is necessary in order to cause a band to increase its frictional grip, to pull its ends together by a small but appreciable amount. This amount represents an angular inaccuracy between the control element and work member. Where an internal lever is used it should be so designed as not to magnify this error and hence that arm of the internal lever to which the control element is attached I make at least equal in length to the other arm, relying on the wrapping friction or other friction members to provide the necessary amplification. In certain instances I may employ an internal lever which is slightly favorable to power amplification but, for the reasons set forth, employ the opposite type of lever whenever possible especially for delicate mechanisms in which accurate synchronism of control element and work member is desired. These internal levers may be employed with all types of servo-mechanisms, and with or without the automatic wedge band adjusting mechanism included in the form or embodiment first described.

I contemplate the use, in developing my invention in its various forms, of friction bands of various sizes, shapes and general construction. In the foregoing embodiments of the invention the bands have been illustrated and described as comprising metallic strips with facings of material such as cork. My invention is in nowise limited, however, to any particular type or construction of friction band or material and I contemplate the use of any modified form of bands which may suit operating conditions. The continuous metallic strip may be replaced for instance by a series of interconnected segments, the band may be in helical instead of substantially annular form, may be a tension band instead of a compression band and be made of any suitable material with or without a facing, as desired.

In each of the embodiments of the invention which has been described heretofore, two drums rotating in opposite directions have been provided. Under some circumstances it may be desired to have only a single drum rotating constantly in one direction and for this reason I have also illustrated, in Figures 19, 20 and 21 a construction in which movement of a work member in either direction may be brought about by power taken from a single drum whose direction of rotation is unchanging. The work shaft here is indicated at 13° and the control element at 14° the control element lying within the work shaft, which is hollowed out for that purpose, with the control arm 30° of the control element projecting thru a radial slot in the work shaft. A single drum 15° is shown, this drum being rotatably mounted upon the work shaft and being operated by any suitable power means. The drum is provided with an axial hub portion 26°′ the cylindrical outer surface of which comprises a friction surface. Two bands are shown to engage the large inner cylindrical friction face of the drum, these bands being indicated at 26° and 27°. The power end P of band 27° is pivotally mounted upon a stud 90 projecting axially from a disk 91 which is keyed to the work shaft. The control end C of this band is pivoted to one arm of a bell crank lever 91′ which is mounted for oscillation on a stud 92 likewise projecting from disk 91. To the other arm of this bell crank lever is connected the power end of a friction band 93, this band passing around the small drum 26°′ and having its control end connected to the outer end of the control arm 30°.

Band 26° has its power end P pivotally connected to a stud 94 which projects laterally from a disk or member 95 mounted for free rotation upon shaft 13°. The control end of this band is pivotally connected to the outer end of a lever 96 the inner end of which is pivotally mounted upon a stud 97 which also projects laterally from disk 95. A spring 98 having one end connected to lever 96 and the other end connected to a stud 99 which projects from disk 95 normally tends to draw the control end of band 26° against the drum.

The periphery of disk 95 is toothed and these teeth mesh with those of a small bevel pinion 100 rotatably mounted on a fixed stud 101. Pinion 100 is likewise in mesh with teeth of a third disk 102, which is keyed to the work shaft.

In the normal operation of the device the band 26°, due to the action of spring 98, is in constant frictional engagement with the drum and the disk 95 therefore is urged to rotate in an anti-clockwise direction (Figure 21). This disk is of course not directly connected to the work shaft and the force tending to rotate the same is transmitted to the work shaft only thru the pinion 100 and the disk 102, so that the force taken from the drum is ultimately applied to the work shaft in such manner as to tend to rotate the work shaft in a clockwise direction. Counterbalancing this constant frictional force tending to rotate the work shaft in a clockwise direction is the constant frictional force of band 27° which tends to rotate the work shaft in a counter-clockwise direction. The band 93 is continuously in light frictional contact with drum 26°′ and band 27° is continuously in relatively light frictional contact with the drum 15°. Normally the clockwise torque exerted on the work shaft exactly equals in magnitude the counter-clockwise torque and hence the work shaft remains stationary.

If the control arm 30° is moved in a clockwise direction (Figure 20) band 93 will be released from contact with drum 26°′ with the result that the friction of band 27° against the drum becomes much less. The friction between band 26° and drum 15° remaining the same however, the torques will no longer be balanced and the shaft will be caused to rotate in a clockwise direction. If the control arm 30° is moved in a counter-clockwise direction (Figure 20) band 93 will more firmly grip the smaller drum 26°′ and the control end C of band 27° will be forcibly thrust against the main drum. A very considerable power will be taken from the main drum therefore and delivered to disk 91 by band 27° and the torque thus generated will overcome the constant torque transmitted to the shaft from band 26°. As a result the shaft will be rotated in a counter-clockwise direction (Figure 20).

That embodiment of the invention which has just been disclosed provides a compact and satisfactory means for obtaining unlimited rotation of a work member in either direction by power from a drum rotating in one direction only. Other mechanisms for performing similar functions, that is, for enabling an operator to secure continuous rotation of a work shaft from a drive member which has only one direction of rotation may be designed and constructed. In the event that continuous rotation of the work member in either direction is not necessary or desirable, the servo mechanism may be greatly simplified without failing to accomplish its principal objects, which are, to provide a mechanism by which an operator may manipulate, or a control device may be caused to manipulate a machine or object which offers great resistance to movement, by power, but always under the complete direct or indirect control of the operator or control device, not only as to exact speed of movement but also as to exact extent of movement.

The work shaft of any form of the apparatus can not transmit to the body to be manipulated or the mechanism to be operated any force greater than is imparted to the servo mechanism by the power means, plus of course the relatively small force which the operator or control motor exerts on the control element. Within the limits of the capacity of the apparatus, however, the response to control is practically instantaneous, the work shaft following in its movements immediately the movements of the control element and the extent of movement of the work shaft being exactly that of the control element. The speed of rotation of the work shaft is that of the speed of rotation of the control element so that the mechanism provides a means for operating the work shaft at any desired speed and through any desired angle and for applying a force by means of the work shaft which is many times greater than that which is applied to the control element.

The power utilized in driving the one or more drums may be derived from any suitable source. A constantly rotating shaft is a convenient source of such power but such shaft need not rotate continuously provided it is rotating when called on to furnish power. The drums need not be rotated continually at the same speed, the mechanism being operative at any speed up to the speed of the drums, since the bands will take sufficient torque from the drums to operate the work member regardless of the exact speed of the drums provided of course, that a sufficient torque is available.

The servo-mechanisms heretofore described have proven to be useful in many fields throughout the mechanical arts and in the following additional figures of the drawings several specific applications of the invention are disclosed.

A mechanism of very simple type for automatically elevating a gun and depressing the same from a distant point is illustrated in Fig. 22. The gun is indicated at 145 and is mounted to rotate about horizontal trunnions 146. Rigid with the gun is a toothed segment 147, the teeth of which mesh with those of an operating gear 148 mounted to rotate about a fixed axis. Gear 148 is rigid with a worm wheel 149 which meshes with a worm 150 on the end of the work member 151 of a servo mechanism of the two drum type. The worm and worm wheel constitute an irreversible gearing, the gun being locked in any position into which it may be adjusted in such manner that it cannot communicate a turning force to the work shaft 151. This function is important. It effectively prevents the body which is being manipulated from exerting such torques on the work shaft as might be transmitted to the shaft of motor 152 to reverse the normal direction of rotation of such shaft. It will be obvious that the irreversible gearing also prevents the transmission of forces from the body being manipulated to the control shaft.

The drums of this servo mechanism are rotated rapidly in opposite directions by a power motor 152. To the control element 153 of the servo mechanism is rigidly connected the rotor of the receiving motor of an alternating current data transmission system 154 which is connected by suitable electrical conductors 155 to a second similarly constructed motor 156 positioned at a distant point, as in the plotting room of a fire control station. Movement of the rotor of motor 156, results in synchronous movements of the rotor of motor 154 and hence of synchronous movement of the control element 153 of the servo mechanism. Movement of the work member 151 of this mechanism is synchronous with the movement of its control element and, since the work member is capable of exerting many times as much power as has been imparted to the control element (and the mechanism will be designed in every case so as to furnish an ample amount of power for the purpose intended), the gun may be freely elevated or depressed.

If the gun is of large size, the servo mechanism may amplify the power of the receiving motor ten thousand times or more and for such large power amplification, a form similar to that illustrated in Figs. 14 to 18 may be employed, that is, a mechanism having a plurality of stages of amplification, or a plurality of servo mechanisms in series.

Figure 23:
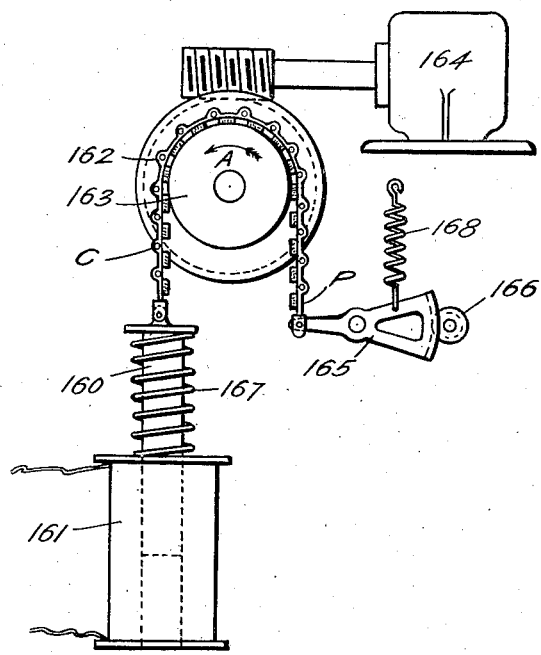
Figure 23 is also a diagrammatic showing of one form of the servo-mechanism as it may be applied to various uses, for instance the manipulation of a valve or damper controlling the flow of air or a combustible fuel to a furnace.

A simple form of the synchronous amplifying control mechanism is shown in Fig. 23. Here the plunger 160 of a solenoid magnet 161 is connected to the control end C of the friction band 162. This band passes around a drum 163 which is driven in the direction of the arrow A by an electric motor 164, and the power end P of the band is connected to one end of a pivotally mounted lever 165. The opposite end of this lever is segmental in shape and is provided with teeth which mesh with those of a pinion 166. Pinion 166 may operate in turn any desired form of control mechanism, such as a damper or fuel regulating device. The plunger 160 of the solenoid will move downwardly as the magnetic attraction of the solenoid increases due to an increased flow of current therethrough, to cause the friction band to operatively engage the rotating drum, and hence the work member 165 will be actuated. A spring 167 opposes downward movement of the plunger and causes it to assume a definite position for any given flow of current through the solenoid. A second spring 168 acting on the work member 165 returns the work member when the pull of the band is relieved.

The current which flows through the solenoid may come from any one of a number of sources. For instance, the mechanism illustrated may be applied to a steam boiler plant so that the plunger 160 may move in sympathy with the fluctuation of boiler pressure. In such a case the pinion 166 may regulate the flow of air to the combustion chamber or grate or may otherwise regulate the fuel supply.

Instead of utilizing an electro-magnetic control motor such as shown in Fig. 23, a pressure motor of the bellows type may be employed. Such an arrangement is shown in Fig. 24, in which figure also a servo mechanism is illustrated of a type capable of moving the work member in either direction, that is, a servo mechanism of the type shown in Figs. 1 to 8 of the drawings. The pressure motor comprises a bellows 170 and a fluid conduit 171 is provided for conducting steam or air under pressure from a boiler or air pressure chamber into the interior of the bellows.

The lower end of the bellows is immovable but its upper end will rise and fall with variations of pressure within it. To this upper end is secured a rack 172 which meshes with the pinion 173 secured on the end of the control element 174 of the servo mechanism indicated generally at S. A spring 175, such as generally utilized with bellows devices of the type illustrated, may be provided, the upper end of this spring bearing against a fixed abutment 176. The work member 177 of the servo mechanism (which mechanism is supplied with power by a power motor 178) has rigidly mounted thereon a beveled pinion 179, the teeth of which mesh with those of a segment 180 mounted to rotate on a fixed arbor 181. An arm 182 projecting downwardly from the segment is connected by a link 183 to a damper 184 in a flue 185 through which the air supply to the fire box of a boiler plant may pass. By means of mechanism such as above described, automatic damper control or fuel supply control may be easily had although, as will be apparent, the power consumption of the control motor, i. e. the bellows 170, may be very slight. Furthermore the response of the mechanism to the movement of the bellows is instantaneous and for each position of the rack 172 the damper will have a corresponding unique position.

Still another form of the synchronous amplifying control mechanism is illustrated in Figs. 25 and 26. Here the control motor is again an expansible bellows 190 into which fluid under pressure is conducted through a conduit 191. Expansion or contraction of the bellows against or with the action of spring 192 results in movement of an operating rod 193. To the end of this operating rod is pivotally connected an interiorly-threaded sleeve 194 and extending within this sleeve, and having threaded engagement therewith, is the end of a rod 195.

Rod 195 has integral with it hub 196 which carries the two radial rods 197 and the arms 198. On rods 197 slide the wedge members 199 impelled in an outward direction by springs 200. Rollers 201 and 202, rotating in bearings attached to the friction disc members 203 and 204 press against the sloping sides of the wedges and tend to force them inwardly. If pressure comes from one side alone on each wedge the friction on the rods prevents the movement of the wedge but if both friction discs are pressing simultaneously, pressure is applied to the wedges from both sides, the rod friction is removed and the wedges move inwardly against the force of the springs.

If pressure is relieved from all the wedge rollers simultaneously, the springs force the wedges outwardly. Backlash and excessive pressure both are thus automatically corrected but a light pressure is always maintained pressing the friction members against their conical seats in the drums 205 and 206. Friction members 203 and 204 carry projecting studs at opposite points of their inside faces, these studs engaging with holes in the arms 198 so that the friction discs can freely move axially but are held in positive rotational engagement with the arms 198 and the shaft 195. Drums 205 and 206 are driven in opposite directions by the continuously rotating motor 207 through the spur gears 208 and idler 209 meshing with teeth cut in the outside periphery of drums 205 and 206.

If rod 195 is moved to the right, disc 203 is pushed into substantial frictional engagement with drum 205 and is thereby caused to rotate with it, this rotation in turn rotating shaft 195, the direction of rotation being such that the rod 195 screws into non-rotatable sleeve 194 and is thereby pulled to the left and friction disc 203 is pulled out of frictional engagement with drum 205. If rod 195 moves to the left disc 204 is rotated in the opposite direction and through the interconnection with threaded sleeve 194, disc 204 is pulled out of its frictional engagement. Thus only longitudinal movements of rod 193 will displace the friction discs from their normally neutral position, and cause such rotation as to bring them back to this neutral position. Rod 195 carries at its right hand end the flexible coupling 210 permitting free endwise movement of 195 but transmitting its rotations to the gear 211. Any longitudinal position of rod 193 is thus represented by a definite angular position of gear 211 and the rotation of gear 211 is executed with considerable power whereas the rod 193 requires only a small amount of power to push the friction discs in and out of engagement. Gear 211 may be attached to further mechanism, the motion of which is required to follow the movements of 193.

As has been previously set forth, the friction bands which may be employed in the servo mechanisms illustrated may be of various designs and constructions. In servo mechanisms employing a plurality of bands, however, it is always desired to have the innermost band or primary band of very light construction. A band which has been found particularly desirable in practice because of its extremely light weight and great strength is illustrated in Fig. 27. This band comprises a plurality of channel-shaped members 220 placed end to end and pivotally connected together by light cross rods 221. Within each channel-shaped section is secured a cork block 222, the friction faces 223 of which are curved cylindrically so that when the band is wrapped around the drum with which it is to cooperate, the friction faces of the cork blocks are contiguous with the friction faces of the drum. A band of this character which will support, in tension, a weight of 14 pounds will weigh only one pound for each two hundred feet.

The band illustrated in Fig. 27 is, of course, intended to be wrapped around a drum and, as in many instances, it may be desirable to have a light weight band of the internal expansion type, I have also perfected such a band, which is illustrated in Fig. 28. Here the aluminum sections are slightly curved plates, indicated at 225, and the cork blocks are secured on the convex surfaces thereof. The ends of the plates are inwardly turned and each adjacent pair of ends is secured together by one or more rivets 226. This band is also of great strength for its light weight and is eminently suitable for many types of the servo mechanism in which internal expanding bands must be used.

Further types of servo mechanisms not of the wrapping friction type are diagrammatically illustrated in Figs. 29, 30 and 31.

In Fig. 29 the numeral 230 indicates a continuous belt which runs over pulleys 231, the belt having a constant movement in the direction of the arrow A under the influence of some suitable outside source of power. The friction shoe 232 is arranged to bear against the belt and to force the belt against a stationary plate 233. This shoe is supported by a linkage which includes toggle members 234 and 235 which are pivotally connected together at 236. Toggle lever 235 carries at its outer end a roller 237 which bears against an abutment 238. The shoe 232 and the roller 237 are connected by links 239 to the lever arms 240 and 241. The adjacent ends of these lever arms are segmental in shape and provided with teeth, the teeth of the two segmental portions intermeshing. Rotation of levers 240 and 241 about the pivotal axes 242 and 243 results in vertical movement of links 239 and hence in vertical movements of shoe 232 and roller 237 to the same extent. The roller 237 is thus always positioned exactly opposite the friction shoe 232.

The pivot 236 which connects the toggle levers 234 and 235 is also connected by a rod 244 to a thermostat 245 supported upon a base 246. With this arrangement, it follows that a downward movement of rod 244 serves to press friction shoe 232 against the belt 230 and to cause a frictional engagement which in turn draws links 239 downwardly until the frictional force disappears. An upward movement of the rod 244, of course, results in the elimination of the normal frictional engagement of the shoe and belt and when such movement occurs a spring 247 acts to rotate levers 240 and 241 and hence to raise links 239. Thus any movement of the rod 244 is immediately followed by corresponding movement of levers 240 and 241. Lever 241 is provided at its outer end with an aperture for the attachment thereto of some mechanism or device whose operations are to be thermostatically governed. For instance to this lever may be pivotally connected a further lever such as indicated at 248 and this last-mentioned lever may operate a valve 249 in a conduit 250. Obviously by means of the intermediate servo mechanism, the slight power of the thermostat is greatly amplified so that the damper or other device may be freely moved even though of considerable magnitude or operating against comparatively large frictional retarding forces.

A final example of an apparatus in which the servo mechanism employed does not act in accordance with the principle of wrapping friction is illustrated in Figs. 30 and 31. Here the shaft 255 is urged to revolve in one direction by any suitable means such, for instance, as a weight 256 which is suspended by a cable 257, the upper end of which passes around the shaft and is finally secured thereto at 258. Mounted upon the shaft for free rotation thereon are the spaced parallel discs 259 and 260, the peripheries of these discs being toothed and such teeth meshing with those of pinions 261 rigidly mounted on a power shaft 262. This power shaft is rotated by any suitable means in the direction of the arrow A and hence the two friction discs are rotated in the direction of the arrows B and at equal speeds.

Shaft 255 is axially hollowed to receive the control shaft 263 and is slotted at a point midway between the discs for the passage therethrough of the control arm 264 rigid with the control shaft or element. The outer end of the control arm 264 is enlarged and, as shown in Fig. 30 is wedge-shaped. The oppositely facing inclined surfaces of this wedge-shaped portion, which is indicated at 265 constitute bearing surfaces for anti-friction rollers 266 rotatably mounted upon friction shoes 267 and 268. The shoes just mentioned are adapted to frictionally engage the discs 259 and 260, the inner faces of which constitute flat friction surfaces. Each shoe is provided with a transverse recess and the rod 269 which is rigidly mounted on the outer end of an arm 270 integral with shaft 255, extends into both of these aligned recesses.

Rotation of the control element 263 in the direction of the arrow C will cause wedge 265 to exert forces on the friction shoes tending to separate them, that is, tending to force these shoes against the friction surfaces of the rotating discs. It is clear then that, with the friction shoes in operative engagement with the respective discs a very considerable power will be taken from these discs by the shoes and transmitted to the arm 270, thus rotating shaft 255 against the action of the weight 256. Motion of the control element in the opposite direction naturally relieves the friction between the shoes and discs and allows the weight 256 to revolve shaft 255 in the same direction. The work shaft 255 (to which may be connected any suitable mechanism to be operated), thus follows its movements immediately, the movements of the control element 263 and the rotational angles and speeds of rotation of the control element and work shaft will be equal.

The control motor here shown for the automatic operation of the control element comprises a speed governor indicated generally at S which governor is of the well known centrifugal ball type. The governor shaft 271 may be driven by any machine whose speed it is desired to automatically control and the work shaft 255 may be connected to a valve which controls the flow of motive fluid to the machine. The movement of the collar 272 which is slidably mounted on the governor shaft, as the governor balls 273 rise and fall, is transmitted to the control element 263 by a lever 274 pivoted at 275. One end of this lever extends into a groove of the sliding collar 272 and its opposite end is provided with a segmental rack 276, the teeth of which mesh with the teeth of a pinion 277 rigidly mounted upon the control element. By the mechanism illustrated complete automatic control of an operating machine may be had even though the valve damper throttle or other device which controls the actual motion of the machine requires far more power to operate it than can be developed by the governor mechanism in its normal operation.

Various types of wrapping friction bands have been designed and constructed for use with the rotating drums, and a number of materials utilized as friction facings. It has been found that with cork a high surface speed very greatly increases the coefficient of friction and consequently accentuates the frictional effects. By the use of a wrapping frictional member of one turn the ratio of forces on the two ends of the band may be 40 to 1 at slow speeds, while at very high speeds, several thousand revolutions a minute for a one inch drum, ratios in excess of 1000 to 1 may be obtained. A frictional member moving in the same direction as the work member but at slower speed likewise has advantages especially for heavy power purposes, since the loss of energy in friction and the heat developed are both less than if the member were stationary. If the member consists of a drum driven from line shafting, for instance, it is obvious that instead of absorbing power from the line shafting it returns power to it.

The power motor may be comprised only of elements which are normally idle but which are capable of delivering mechanical power when called upon (e. g. certain types of hydraulic, spring and gravity motors) as well as motors of the more common type comprised of elements, one of which is normally in motion (e. g. electric motor, steam engine, etc.)

By the term syntactic as herein used, I mean to imply that for every position of a movable element in the control motor or automatic means there is one and only one corresponding position of the work member, such correspondence of positions occurring simultaneously.

Having thus described the invention what is claimed as new and desired to be secured by Letters Patent is:

1. A servo mechanism comprising in combination, a rotatable work shaft, two rotatable members having friction surfaces concentric with the axis of said work shaft, power means for rotating said members in opposite directions, a friction band associated with each rotatable member and having one end operatively connected to the work shaft, and a rotatable control shaft coaxial with the work shaft, a cross arm rigidly mounted on said control shaft and having two spaced parallel ring members secured thereto, said ring members being concentrically arranged with respect to the control shaft, work shaft and friction surfaces, and means connecting the free end of each band to one of the ring members.

2. A servo mechanism including in combination, a work member movable in two directions, two power driven members arranged to move in opposite directions, a friction member associated with each power member and in constant engagement therewith, manually operable means for bringing either friction member individually into effective engagement with the respective power members, and means connecting each friction member to the work member for the transmission of power thereto which means includes a device for preventing simultaneous engagement of the friction members with the oppositely moving power members of such degree as would result in the development of substantial opposing forces from both friction members simultaneously.

3. A servo mechanism which includes a work member, oppositely moving power driven members, friction devices which alternately take power from said oppositely moving power driven members but which are both normally in light frictional engagement with said members respectively and means for transmitting power from either friction device to the work member which means automatically prevents the development of substantial opposing forces from both friction devices simultaneously.

4. A servo mechanism which includes a work member movable in two directions, oppositely moving power driven members, and means for taking power from said members and transmitting it to the work member, said means including a device which automatically moves upon the simultaneous development of substantial opposing forces to prevent such opposed forces from being transmitted to the work member.

5. A servo mechanism including a work member movable in two directions, two members having friction surfaces and arranged to be power driven in opposite directions, a friction member associated with each of said power driven members and adapted to be brought into effective engagement therewith, and means common to both of said friction members for transmitting power to the work member, said means being designed and constructed to permit alternate action of the friction members but not simultaneous action thereof.

6. A servo mechanism including a work member movable in two directions, two members having friction surfaces and arranged to be power driven in opposite directions, a friction member associated with each of said power driven members and adapted to be brought into effective contact therewith, and means common to both of said friction members for transmitting power to the work member, said means including an abutment member which transmits power when either of said friction members is effectively engaged but not when both simultaneously engage the corresponding power driven members.

7. A servo mechanism including a work member movable in two directions, two members having friction surfaces and arranged to be power driven in opposite directions, a friction member associated with each of said power driven members and adapted to be brought into effective engagement therewith, and means common to both of said friction members for transmitting power to the work member, said means including a movable abutment member which transmits power when either friction member is active but which moves to release both friction members from substantial engagement with the power driven members when both become active simultaneously.

8. In a servo mechanism, in combination, a rotatable work member, a radially extending guide rigid therewith, an abutment member slidably mounted on the guide, said member having oppositely inclined side faces, power driven members movable along paths normal to said guide, a friction device associated with each of said power driven members and each having its power delivery end abutting against one of the inclined faces of the abutment member, the arrangement being such that the abutment member will remain immovable when either friction device is effectively engaged but will yield inwardly when both simultaneously tend to effectively engage the corresponding power driven members.

9. The combination set forth in claim 8, but including means for yieldingly urging the abutment member outwardly.

10. The combination set forth in claim 8, but including a spring device for yieldingly urging the abutment member outwardly.

11. In a servo mechanism, in combination, a rotatable work shaft, two rotatable members having friction surfaces concentric with said shaft, power means for rotating said members in opposite directions, a friction band associated with each of said members each band having a power delivery end and a control end and being adapted to be brought into substantial frictional engagement with the corresponding rotatable member, and means connected to the work member for transmitting power from either band thereto which means automatically releases the bands from substantial engagement with the rotatable members whenever they tend to simultaneously effectively engage said members.

12. In a servo mechanism, in combination, a rotatable work shaft, two rotatable cylindrical members or drums having cylindrical inner friction faces concentric with said shaft, a friction band associated with each of said friction faces and having a power end and a control end, each band being adapted to be brought into substantial frictional engagement with the corresponding friction surface, and means for transmitting power from the power end of each band to the work member, said means including an outwardly tapering wedge member against the inclined faces of which the power ends of the bands abut, a radially disposed rod rigid with the work member on which the wedge is slidably mounted, and resilient means for urging the said wedge outwardly.

13. The combination set forth in claim 12 but in which the power ends of the bands are provided with anti-friction rollers.

14. In a servo mechanism, in combination, a rotatable work shaft, two rotatable cylindrical members or drums having cylindrical inner friction faces concentric with said shaft, a friction band associated with each of said friction faces and having a power end and a control end, each band being adapted to be brought into substantial frictional engagement with the corresponding friction surface, two rocker arms having their inner ends pivotally connected to the work member and to the outer ends of which the power ends of the bands are pivotally connected, and means for transmitting power from the power end of each band to the work member, said means including an outwardly tapering wedge member against the inclined faces of which the power ends of the bands abut, a radially disposed rod rigid with the work member on which the work member is slidably mounted, and resilient means for urging the said wedge outwardly.

15. Servo mechanism including a shaft rotatable in either direction, oppositely moving power driven members, a friction device associated with each and adapted to be brought into substantial engagement therewith, and means for transmitting power from the friction devices to said shaft comprising a device automatically movable relatively to both friction devices for preventing substantial engagement of both friction devices simultaneously.

16. In a servo mechanism, in combination, a control element, a work member movable in two directions, a source of power, a device operable by said control element for connecting the source of power to the work member for operation of said work member in one direction, a second device operable by said control element for connecting the source of power to the work member for operation of the work member in the opposite direction, and automatic means for preventing said devices from simultaneously taking from the source of power, and delivering to the work member, more than a predetermined amount of power.

17. In a servo mechanism, in combination, a manually operable control element, a work member movable in two directions, a source of power, a device operable by said control element for connecting the source of power to the work member for operation of said work member in one direction, a second device operable by said control element for connecting the source of power to the work member for operation of the work member in the opposite direction, and automatic means for substantially preventing backlash between the control element and work member.

18. In a servo mechanism, in combination, a manually operable control element, a work member movable in two directions, a source of power, a friction device operable by said control element for connecting the source of power to the work member for operation of said work member in one direction, a second friction device operable by said control element for connecting the source of power to the work member for operation of the work member in the opposite direction, and automatic means associated and co-acting with both friction devices for preventing said friction devices from simultaneously taking from the source of power, and delivering to the work member more than a predetermined amount of power.

19. In a servo mechanism, in combination, a manually operable control element, a work member movable in two directions, a source of power, a friction device operable by said control element for connecting the source of power to the work member for operation of said work member in one direction, a second friction device operable by said control element for connecting the source of power to the work member for operation of the work member in the opposite direction, and automatic means for substantially preventing backlash between the control element and work member.

20. In a servo mechanism, in combination, a manually operable control element, a work member movable in two directions, two drums rotating in opposite directions, a friction device operable by said control element for effectively connecting one of said drums to the work member for operation of said work member in one direction, a second friction device operable by said control element for connecting the second drum to the work member for operation of the work member in the opposite direction, and automatic means for compensating for wear in said friction devices, said means comprising an element which simultaneously advances both friction devices toward their respective drums when wear occurs.

21. A servo mechanism including in combination, a work member movable in two directions, two power driven members arranged to move in opposite directions, a friction member associated with each power driven member and in constant but normally ineffective engagement therewith, a connection between each friction member and the work member, means for bringing the friction members individually into effective engagement with the respective power driven members, and means for controlling the normal ineffective pressures of the friction members against their respective power driven members.

22. A servo mechanism including in combination, a work member movable in two directions, two power driven members arranged to move in opposite directions, a friction member associated with each power driven member and in constant but normally ineffective engagement therewith, a connection between each friction member and the work member, means for bringing the friction members individually into effective engagement with the respective power driven members, and means whereby the normal ineffective pressures of the friction members against their respective power driven members may be simultaneously regulated.

23. A servo mechanism including in combination a work member movable in two directions, two power driven drums having cylindrical friction faces and arranged to rotate in opposite directions, a friction band associated with each drum and in constant but normally ineffective engagement therewith, a connection between each friction band and the work member, means for bringing the friction bands individually into effective engagement with their respective power driven drums, and means for radially adjusting the friction bands to control, by such adjustment, the normal ineffective pressures of the friction bands against the power driven drums.

24. A servo mechanism including in combination, a work shaft rotatable in either direction, two power driven drums having cylindrical friction faces and arranged to rotate in opposite directions about the axis of the work shaft, a friction band associated with each drum and in constant but normally ineffective engagement therewith, the ends of the bands being adjacent the friction surfaces of the drums, a connection between each friction band and the work member, means for bringing the friction bands individually into effective engagement with their respective power driven drums, and means whereby the ends of each band may be relatively adjusted circumferentially of the associated friction drum to effect a radial adjustment of the band and a modification of the normal ineffective pressure of the band against its drum.

25. A servo mechanism of the class described including two drums power driven in opposite directions, a friction band normally in contact with each drum, and means associated with said bands for simultaneously effecting a change in the normal pressure of each band against the corresponding drum.

26. In a servo-mechanism in combination, a work member, a control element, a power driven member and means connecting the control element and work member including an internal lever operatively connected to the control element and a wrapping friction member connecting the internal lever and work member and arranged to take power from the power driven member.

27. In a servo mechanism, in combination, a continuously rotating power driven member having a cylindrical friction surface, a rotatable work shaft, a rotatable control element, said friction surface, work shaft and control element being coaxial, and a wrapping friction member connecting the control element and work shaft and having substantially its entire length in constant frictional engagement with the said friction surface, the arrangement being such that the intensity of frictional engagement of the wrapping friction member upon the friction surface may be modified by movement of the control element, for the purpose of varying the amount of power taken from the power member and transmitted to the work shaft, the work shaft being operated by power taken from the power member through an angle and at a speed proportional to the angular movement and speed of the control element, the movements of the work shaft following without appreciable lag the movements of the control element.

28. A servo mechanism comprising in combination, two members rotatable about a common axis, each being provided with a cylindrical friction surface, power means for normally rotating said members in opposite directions, a wrapping friction band associated with each rotatable member and normally in frictional engagement therewith, a control element to which the control end of each band is connected, and a work member to which the work end of each band is connected, movement of the control element in either direction modifying the intensity of frictional engagement between one of said bands and its associated power driven member and resulting in movement of the work member in a corresponding direction.

29. A servo mechanism comprising in combination, two members rotatable about a common axis, each being provided with a cylindrical friction surface, power means for normally maintaining said members in rotation in opposite directions, a wrapping friction band associated with each rotatable member and normally in frictional engagement therewith, a control element, and a work member, said element and member being both coaxial with said rotatable members, the control ends of said bands being operatively connected to the control element and the power delivery ends of the bands to the work member, opposing forces of equal magnitude being transmitted to the work member by the bands when the control element is not subjected to actuating force, and an unbalanced force being transmitted to the work member to cause the same to rotate, when an actuating force is applied to the control element, the rotation of the work member being substantially the same in extent and speed as the rotation of the control element.

30. A servo mechanism comprising in combination, a control element which may be given measured movements under the influence of relatively small forces applied manually or by power means, a work member operatively connected to an object or instrumentality to be operated in syntactic relationship to the control element, a constantly available power source, and a mechanical connection between the control element and work member having constant frictional engagement with the power source, change in the magnitude of the force applied by the control element modifying the intensity of frictional engagement of the power source and mechanical connection, thereby varying the amount of power taken from the power source and transmitted to the work member, the work member so manipulating the object connected thereto that it bears a syntactic relationship to the control member at all times.

31. A servo mechanism comprising in combination, a control element which may be given measured movements of rotation under the influence of relatively small forces applied manually or by power means, a rotatable work member operatively connected to an object or instrumentality to be operated in syntactic relationship to the control element, a constantly available power source including a constantly rotating power driven member having a friction face, and a mechanical connection between the control element and work member having a friction face in constant frictional engagement with the friction face of the rotating power driven member, change in the magnitude of the force applied by the control element modifying the intensity of frictional engagement of the power driven member and connection, thereby varying the amount of power taken from the power source and the amount of force transmitted to the work member, the work member so manipulating the object connected thereto that it bears a syntactic relationship to the control member at all times.

32. A servo mechanism comprising in combination, a control element which may be given measured movements under the influence of relatively small forces applied manually or by power means, a work member operatively connected to an object or instrumentality to be operated in syntactic relationship to the control element, a constantly available power source including a rotating member having a friction face, and a wrapping friction member having its control end connected to the control element, its power end to the work member, and an intermediate portion in constant frictional engagement with the rotating power driven member, change in the magnitude of the force applied by the control element modifying the intensity of frictional engagement of the power source and wrapping friction member, thereby varying the amount of power taken from the power source and the amount of force transmitted to the work member, the object connected to the work member being so actuated thereby that it bears a syntactic relationship to the control member at all times.

33. A servo mechanism comprising in combination, a control element which may be given measured movements of rotation under the influence of relatively small forces applied manually or by power means, a rotatable work member operatively connected to an object or instrumentality to be operated in syntactic relationship to the control element, a constantly rotating power driven member having a cylindrical friction face, a wrapping friction member having substantially its entire length in constant frictional engagement with the friction face of the power driven member, the control end of said wrapping friction member being connected to the control element and the power delivery end of the same to the work member, change in the magnitude of the force applied by the control element modifying the intensity of frictional engagement of the wrapping friction member and the power driven member, thereby varying the amount of power taken from the power source and the amount of force transmitted to the work member, the object connected to the work member being so actuated thereby that it bears a syntactic relationship to the control member at all times.

34. A servo mechanism comprising in combination, a control element which may be given measured movements in two directions under the influence of relatively small forces, a work member operatively connected to an object or instrumentality to be operated in syntactic relationship to the control element, said member being likewise operable in two directions, a constantly available power source including two members moving constantly in opposite directions, a friction member associated with each power driven member and in constant but normally ineffective engagement therewith, each such friction member being connected to the control element so as to be operated thereby, and a connection between each friction member and the work member, whereby the power taken from either power driven member by its associated friction member may be transmitted to the work member, the object connected to the work member being so actuated thereby that it bears a syntactic relationship to the control member at all times.

35. A servo mechanism including in combination, a work member movable in two directions, a power shaft moving in one direction, two members adapted to be driven by said shaft in opposite directions, a friction member associated with each power driven member and in constant but normally ineffective engagement therewith, a connection between each friction member and the work member, means for bringing either friction member into effective engagement with its associated power driven member, means for controlling the normal ineffective pressures of the friction members against their respective power driven members, and a driving connection between the power shaft and the power driven members including a clutch device, whereby the power shaft and said members are automatically disconnected when the direction of rotation of the power shaft is reversed.

36. A servo mechanism comprising in combination, a control element which may be moved in two directions under the influence of relatively small forces, a work member operatively connected to an object or instrumentality to be operated in syntactic relationship to the control element, said member being likewise operable in two directions, a constantly available power source including two members rotating in opposite directions and having cylindrical friction faces, a wrapping friction band associated with each power driven member and in constant but normally ineffective engagement therewith, each such band being connected to the control element to be operated thereby, and a connection between each friction band and the work member whereby the power taken from either power driven member by its associated friction member may be transmitted to the work member, the object connected to the work member being so actuated thereby that it bears a syntactic relationship to the control member at all times.

37. A servo-mechanism comprising in combination, a frame, coaxial shafts rotatably mounted in the frame, one shaft constituting a control element and the second constituting a work shaft, two drums also supported in the frame each having a cylindrical friction face centered on the axis of said shafts, power means for rotating at least one of said drums, a wrapping friction band associated with each drum and disposed to engage the friction face thereof, means connecting the control ends of the bands to the control element, means connecting the work ends of the bands to the work shaft, and a transverse member secured to each shaft, the two transverse members being normally out of contact with each other but being arranged to interlock upon the occurrence of appreciable relative rotation of said shafts.

38. A servo mechanism comprising in combination, a member rotatable about an axis and having a cylindrical friction face, a control element, a work member, a flexible friction band connecting the control element and work member, which band wrappingly engages the friction face of the rotatable member, a source of power, and means connecting the power source and the rotatable member for driving the said member in one direction, said means automatically disconnecting the power source and rotatable member when the angular speed of rotation of the control element becomes greater than the angular speed at which the rotatable member is driven from the power source.

39. A servo mechanism comprising in combination, a work shaft rotatable in either direction of rotation, a control element likewise rotatable in either direction, two rotatably mounted drums each having a cylindrical friction surface, a flexible friction band associated with each drum and adapted to wrappingly engage the friction surface thereof, each band having one end operatively connected to the control element and the other end operatively connected to the work shaft, a power source, and means connecting the power source and the drums whereby said drums are driven in opposite directions, said means automatically disconnecting the power source and rotatable members when the angular speed of rotation of the control element in one direction becomes greater than the angular speed of that drum which is moving in the same direction.

40. Mechanism for manipulating a body in accordance with the movements of a control element, comprising in combination with such body, a work member, a control element, a drum having a cylindrical face, a wrapping friction band connecting the control element and work member adapted to frictionally engage said cylindrical face, a power shaft operatively connected to said drum to rotate the same, and means to substantially prevent reversal of said power shaft by forces exerted by said body.

41. Mechanism for manipulating a body in accordance with the movements of a control element comprising in combination with such body, a work member, a control element, a drum having a cylindrical face, a wrapping friction band connecting the control element and work member adapted to frictionally engage said cylindrical face, a power shaft operatively connected to said drum to rotate the same, and means operatively connected to the work member to prevent said body exerting a substantial torque on the work member.

42. A mechanism for manipulating a body in accordance with the movements of a control element, comprising in combination with such body, a work member rotatable in either direction of rotation, a control element likewise rotatable in either direction, two rotatably mounted drums each having a cylindrical surface, a flexible friction band associated with each drum and adapted to wrappingly engage the cylindrical surface thereof, each band having one end operatively connected to the control element and the other end operatively connected to the work member, a power shaft operatively connected to said drums to rotate the same in opposite directions, and means to substantially prevent reversal of rotation of said power shaft by forces exerted by said body.

In testimony whereof I hereunto affix my signature.

HENRY W. NIEMAN.